US007665557B2

(12) United States Patent
Hughes et al.

(10) Patent No.: US 7,665,557 B2
(45) Date of Patent: Feb. 23, 2010

(54) HYBRID ELECTRIC POWERTRAIN WITH ANTI-IDLE FUNCTION

(75) Inventors: Douglas A. Hughes, Wixom, MI (US);
Jeff Skorvpski, Kalamazoo, MI (US);
Thomas R. Stover, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 679 days.

(21) Appl. No.: 11/154,427

(22) Filed: Jun. 16, 2005

(65) Prior Publication Data
US 2007/0000703 A1 Jan. 4, 2007

(51) Int. Cl.
*B60W 20/00* (2006.01)
(52) U.S. Cl. ............... 180/65.28; 180/65.27; 180/53.8
(58) Field of Classification Search ............... 180/53.8, 180/65.2, 65.4; 903/941, 948; 320/104, 320/132
See application file for complete search history.

(56) References Cited

U.S. PATENT DOCUMENTS

| | | | |
|---|---|---|---|
| 5,285,862 | A | 2/1994 | Furutani et al. |
| 5,789,882 | A * | 8/1998 | Ibaraki et al. ............... 318/148 |
| 5,820,172 | A * | 10/1998 | Brigham et al. ........... 290/40 C |
| 5,883,496 | A * | 3/1999 | Esaki et al. ................. 320/132 |
| 6,262,491 | B1 * | 7/2001 | Kitajima et al. ........... 290/40 C |
| 6,484,831 | B1 | 11/2002 | Gauthier |
| 6,487,477 | B1 * | 11/2002 | Woestman et al. ............. 701/22 |
| 6,583,599 | B1 * | 6/2003 | Phillips et al. ............... 320/104 |
| 6,612,386 | B2 * | 9/2003 | Tamai et al. ............... 180/65.4 |
| 6,624,529 | B2 * | 9/2003 | Obayashi ................... 290/40 C |
| 6,664,651 | B1 | 12/2003 | Kotre et al. |
| 6,832,148 | B1 | 12/2004 | Bennett et al. |
| 6,863,139 | B2 * | 3/2005 | Egami et al. ............... 180/53.8 |
| 6,986,398 | B2 * | 1/2006 | Obayashi ................... 180/65.2 |
| 7,174,977 | B2 * | 2/2007 | Enjoji et al. ............... 180/65.1 |
| 7,292,932 | B1 * | 11/2007 | Ledger et al. ............... 701/110 |
| 7,296,648 | B2 * | 11/2007 | Tatara et al. ................ 180/242 |

(Continued)

FOREIGN PATENT DOCUMENTS

EP 1 077 149 A2 2/2001

(Continued)

OTHER PUBLICATIONS

International Search Report for Application No. PCT/IB2006/001594 Mailed Jun. 12, 2006.

(Continued)

*Primary Examiner*—Jeffrey J Restifo
(74) *Attorney, Agent, or Firm*—Dykema Gossett PLLC

(57) ABSTRACT

A method is provided for reducing engine idling time in a hybrid vehicle that includes a vehicle accessory and a hybrid powertrain having an engine, a generator operatively coupled to the engine, and an energy source. The method includes selectively powering the vehicle accessory using the energy source while the engine is not running, monitoring the energy source state of charge, selectively starting the engine when the energy source state of charge is less than or equal to a predetermined minimum state of charge, operating the engine driven generator to recharge the energy source to a predetermined maximum state of charge, and turning off the engine when the energy source state of charge is greater than or equal to the predetermined maximum state of charge. A hybrid electric vehicle power delivery system is also provided.

4 Claims, 2 Drawing Sheets

U.S. PATENT DOCUMENTS

| | | | |
|---|---|---|---|
| 7,443,139 B2* | 10/2008 | Mitsui et al. | 320/134 |
| 7,489,101 B2* | 2/2009 | Bockelmann et al. | 320/104 |
| 2001/0026142 A1* | 10/2001 | Furukawa et al. | 320/103 |
| 2002/0021007 A1 | 2/2002 | Morimoto et al. | |
| 2003/0132730 A1* | 7/2003 | Ochiai | 320/104 |
| 2004/0006419 A1 | 1/2004 | Kimura | |
| 2005/0061561 A1 | 3/2005 | Leonardi et al. | |
| 2007/0000703 A1* | 1/2007 | Hughes et al. | 180/65.4 |
| 2009/0045780 A1* | 2/2009 | Bergkoetter et al. | 320/136 |

FOREIGN PATENT DOCUMENTS

| | | |
|---|---|---|
| EP | 1 086 846 A2 | 3/2001 |

OTHER PUBLICATIONS

Written Opinion of the International Search Authority for Application No. PCT/IB2006/001594.

* cited by examiner

HYBRID ELECTRIC POWERTRAIN WITH ANTI-IDLE FUNCTION

BACKGROUND OF THE INVENTION

1. Field of the Invention

The present invention relates generally to a hybrid powertrain system and to a method of operating a hybrid powertrain system to reduce the idling time of an internal combustion engine.

2. Description of the Related Art

The motor vehicle industry is actively working to develop alternative powertrain systems in an effort to improve vehicle fuel economy and reduce the level of pollutants exhausted into the air by conventional powertrain systems equipped with internal combustion engines. Significant development efforts have been directed to electric and fuel-cell vehicles. Unfortunately, these alternative powertrain systems currently suffer from several limitations and, for all practical purposes, are still under development. However, "hybrid" vehicles, which typically include an internal combustion engine and an electric motor, offer a compromise between traditional internal combustion engine powered vehicles and full electric powered vehicles.

Heightened by government recommendations, pending and considered legislation, record high crude oil prices, and environmental concerns, reduction in diesel engine idling is becoming a significant target in efforts to reduce fuel consumption and emissions from heavy-duty trucks and other diesel-powered commercial vehicles. Heavy-duty truck operators, for example, typically idle their vehicle engines to heat or cool in their cab, warm their engine block after cold starts, or power auxiliary and hotel electrical loads. While fuel savings and air quality are the core motivators in reducing engine idling, noise emissions, engine wear and maintenance are also contributing factors.

A variety of manufacturers are developing and promoting remote systems designed to allow vehicle operators and fleets to reduce idling time. Once such system requires trucks to be equipped with electrical connection points that are connectable to remote electrification systems that provide electric power to drive a range of systems, including cab heating/cooling and electrical distribution systems. While these systems permit a vehicle operator to operate vehicle components without running the engine, use of these systems is limited due to cost and unavailability.

SUMMARY OF THE INVENTION

A method is provided for reducing engine idling time in a hybrid vehicle that includes a vehicle accessory and a hybrid powertrain having an engine, a generator operatively coupled to the engine, and an energy source. In an embodiment, the method includes selectively powering the vehicle accessory using the energy source while the engine is not running and monitoring the energy source state of charge. When the energy source state of charge is less than or equal to a predetermined minimum state of charge, the engine is started and operated to recharge the energy source to a predetermined maximum state of charge. Once the energy source state of charge is greater than or equal to the predetermined maximum state of charge, the engine is turned off and the vehicle accessory is powered using the recharged energy source. A hybrid electric vehicle power delivery system is also provided. Other aspects of the invention will be apparent to those skilled in the art after review of the drawings and detailed description provided below.

BRIEF DESCRIPTION OF THE DRAWINGS

Embodiments of the invention will now be described, by way of example, with reference to the accompanying drawings, wherein.

DETAILED DESCRIPTION

Figure 1:
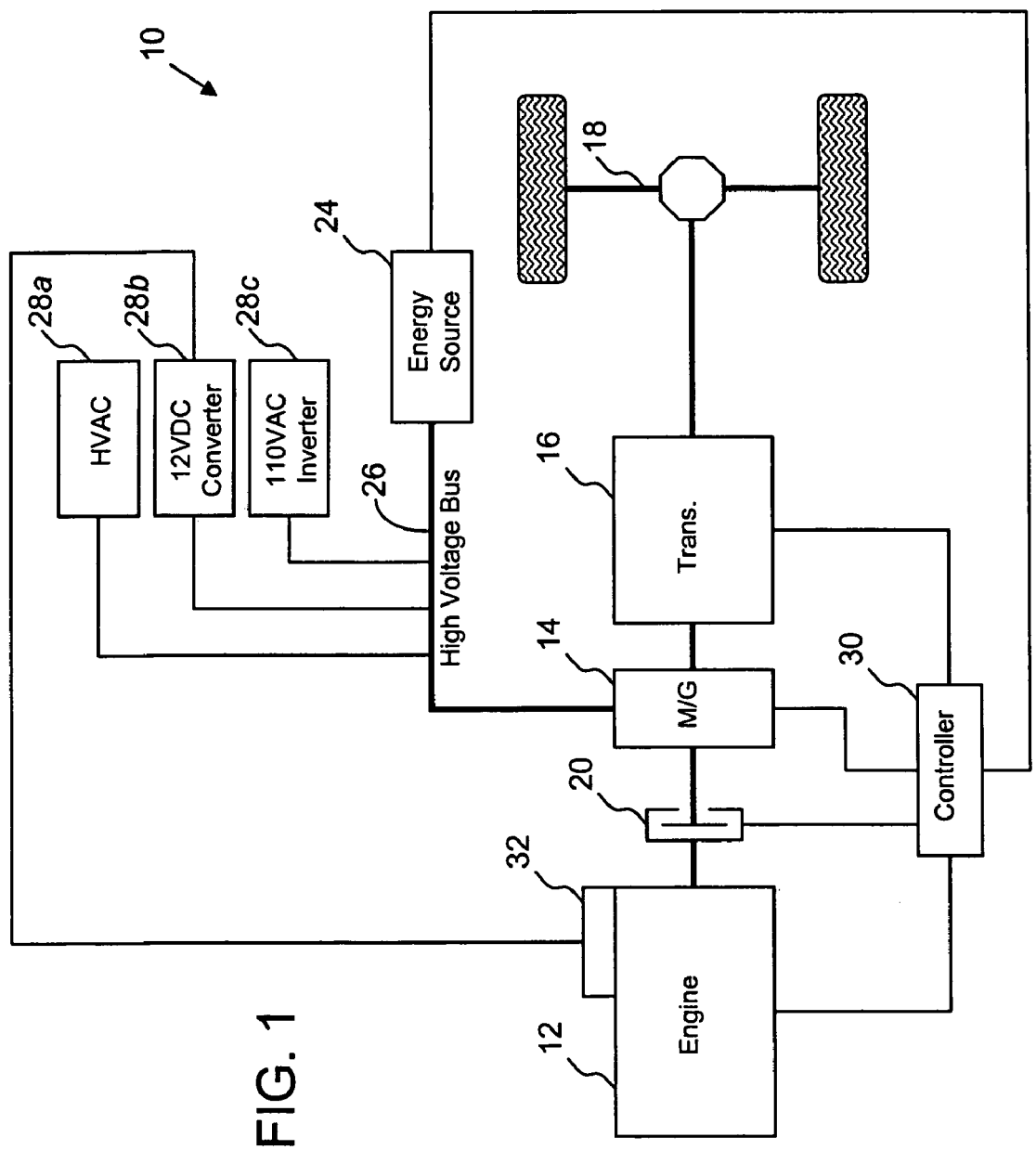
FIG. 1 is a schematic illustration of an exemplary hybrid electric vehicle powertrain arrangement.

Referring to FIG. 1, an exemplary hybrid vehicle powertrain arrangement 10 is shown. In the exemplary arrangement, hybrid powertrain 10 includes an engine 12, such as a diesel or gasoline-fueled internal combustion engine, an electric motor-generator 14, and an engine and/or motor-driven power transmission mechanism 16. Hybrid powertrain 10 operates as a parallel hybrid powertrain system, permitting motor-generator 14 to drive power transmission mechanism 16 alone or in combination with engine 12 to provide motive power to a vehicle drive-axle 18. When so configured, engine 12 may be used as the prime mover whose power is supplemented by motor-generator 14. An optional clutch 20 may be positioned between engine 12 and motor-generator 14 to selectively couple or uncouple engine 12 from motor-generator 14 and/or power transmission mechanism 16. Hybrid powertrain arrangement 10 is provided for reference only and is not intended to limit the scope of the present invention.

The energy required to operate motor-generator 14 may be supplied by an energy source 24, such as a main "hybrid" battery or bank of batteries for powering motor 14. Energy source 24 is electrically linked to motor-generator 14 by a relatively high voltage electrical bus 26, such as a 42V bus. In addition to energy source 24, at least one electrically powered vehicle accessory 28 is linked to bus 26 and selectively draws power from energy source 24 through bus 26 for operation. As shown in FIG. 1, these electrically powered vehicle accessories may include, for example, a heating, ventilation and air-conditioning (HVAC) system 28a, as well as various power conversion devices, such as a 12 VDC converter 28b and a 110 VAC inverter 28c.

In an embodiment, operation of hybrid powertrain 10 is controlled by a controller 30, such as a microprocessor-based electronic control unit. Controller 30 may include or be linked to one or more sub-controllers (not shown), such as a battery controller, for controlling operation of one or more individual powertrain components. Controller 30 may also communicate with a vehicle engine controller (not shown), which may also be housed in the same unit.

In a mode of operation, controller 30, energy source 24 and vehicle accessories 28 may remain operational when engine 12 is turned off. During this mode of operation, energy source 24 provides the sole power to operate vehicle accessories 28. For example, in heavy-duty trucks that include a sleeper cab, energy source 24 may provide "hotel" power to vehicle accessories 28a-c, which in turn air-condition or heat the cab, and/or provide power for cab lights and other electrically powered equipment used by the vehicle occupant(s). Known as "hotel power mode" in the context of heavy-duty truck operation, controller 30, energy source 24 and electrically powered vehicle accessories 28 may be operated to provide the power necessary to comfortably support the vehicle occupant(s) without continuously running or "idling" engine 12.

Energy source 24, functioning as a battery for example, will discharge at some rate depending on the magnitude of the electrical load applied by vehicle accessories 28. The extent of discharge may be determined by monitoring the battery's state of charge (SOC)—the battery's available capacity expressed as a percentage of its rated capacity. Knowing the amount of energy left in a battery compared with the energy it had when it was fully charged gives an indication of how much longer a battery will continue to perform before it needs recharging. In the illustrated powertrain arrangement, when the SOC of energy source 24 is generally equal to or less than a predetermined minimum SOC, engine 12 may be started and operated to drive generator 14 to provide electrical energy for powering vehicle accessories 28 and/or recharging battery 24. The present invention provides a method and system for controlling operation of engine 12 to recharge energy source 24 during operation in, among other modes, the "hotel power mode."

Figure 2:
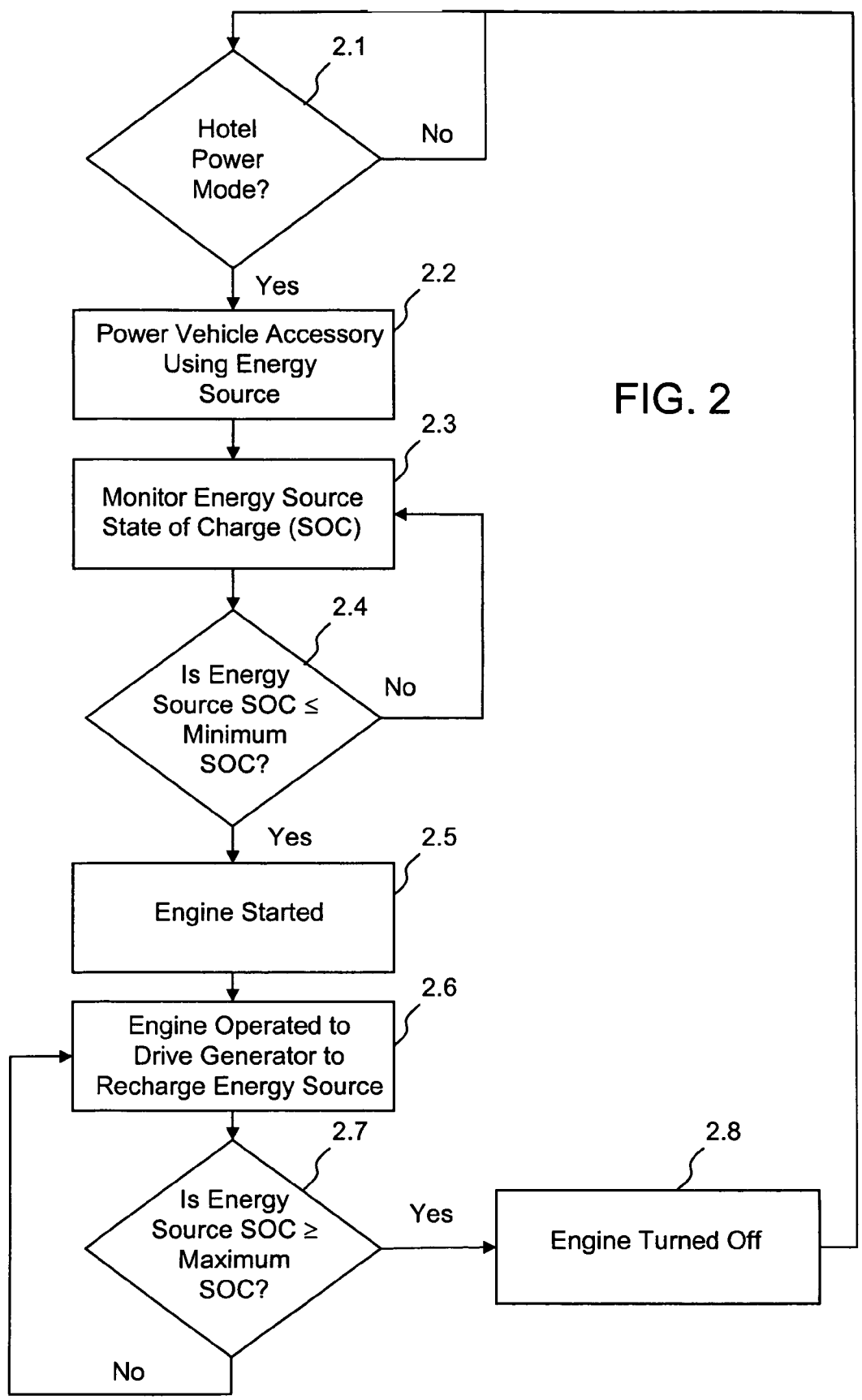
FIG. 2 illustrates a logic flow diagram for operating a hybrid electric vehicle according to an embodiment of the present invention.

Referring to FIG. 2, a logic flow diagram depicting a method, according to an embodiment of the present invention, for reducing engine idling time in a hybrid vehicle that includes a vehicle accessory and a hybrid powertrain including an engine, a generator operatively coupled to the engine, and an energy source. By way of example, energy source 24 will be described as comprising a battery for storing electrical energy generated by generator 14.

In the illustrated embodiment, it may first be determined whether the vehicle is operating in "hotel power mode" (step 2.1). Entry into "hotel power mode" may be initiated, for example, by a driver selectable switch or when the vehicle parking brake is applied with the engine turned off. If the vehicle is operating in "hotel power mode," at least one electrically powered vehicle accessory 28 is selectively powered using energy source 24 while engine 12 is not running (step 2.2). During operation of electrically powered vehicle accessory 28, the energy source SOC is monitored (step 2.3). If the energy source SOC is generally less than or equal to a predetermined minimum SOC (step 2.4), engine 12 is started (step 2.5), and operated to drive generator 14 to recharge energy source 24 to a predetermined maximum state of charge (step 2.6). In an embodiment, engine 12 may be operated at predetermined speed and load, for example the speed and load associated with the most efficient recharging of energy source 24, until the energy source SOC is greater than or equal to a predetermined maximum SOC (step 2.7), at which point the engine is turned off (step 2.8) and energy source 24 alone provides the electrical power needed to operate vehicle accessory 28.

In a particular configuration, the minimum energy source SOC is about 20% and the maximum energy source SOC is about 70%. It will also be appreciated that control logic other than logic based solely on the minimum or maximum energy source state of charge may be employed in the method and system of the present invention, including, without limitation, logic that takes into account the temperature and/or age of energy source 24.

The step of starting engine 12 (step 2.5) may include engaging clutch 20, if required, and operating motor-generator 14 to crank engine 12. This function is premised upon energy source 24 having sufficient energy remaining to operate motor-generator 14 in this capacity. Engine 12 may also be equipped with an optional starter motor 32 powered by energy source 24 through 12 VDC converter 28*b*. When so configured, the step of selectively starting engine 12 (step 2.5) may include disengaging clutch 20, if required, and operating starter motor 32 to crank engine 12. Controller 30 may be configured to identify when operation of motor-generator 14 as a starting motor is permitted and when operation of optional starter motor 32 is required due to insufficient energy in energy source 24, and to control operation of motor-generator 14 or starter motor 32 to start engine 12.

For a heavy-duty truck operating in "hotel power mode," the method and system according to the present invention can facilitate a reduction in the amount of time engine 12 is operating or "idling." An exemplary duty cycle illustrating several benefits of the present invention is described below based on the following illustrative parameters:

Energy Source Storage Capacity: about 3.8 kWh; and
SOC range of Energy Source: about 20-70%.

Using the above parameters, the usable storage capacity of energy source 24 is about 1.9 kWh. In an exemplary vehicle installation, the load applied by the vehicle accessories includes about 2.3 kW for the HVAC system and about 0.7 kW for the 12 VDC converter and 110 VAC inverter to power vehicle lights, a television, and a personal computer, for a total load of about 3.0 kW. At this load, the energy stored in energy source 24 will be consumed in about 38 minutes (1.9 kWh/3 kW*60 m/h). To recharge energy source 24 to the predetermined maximum SOC, engine 12 may be started and operated to drive generator 14 to produce power. In an embodiment, charging may occur at a rate generally equal to the maximum generator output (e.g., 44 kW) less the electrical load on the bus (e.g., 3 kW). In the preceding example, charge time would be about 2 minutes, 47 seconds (1.9 kWh/41 kW*60 m/h). The engine duty cycle associated with the above scenario is about 6.87.3%; however, the on-time duration and frequency of engine operation may be managed within this duty cycle to comply with various legislative vehicle idling limits while maintaining the requisite level of power need to operate vehicle accessories 28.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A method for reducing idling time of an internal combustion engine powered hybrid electric vehicle that includes an electrically powered vehicle accessory operable in a hotel power mode to provide one or more conveniences to a vehicle occupant and a hybrid powertrain having an internal combustion engine driven generator and a battery, the method comprising:

determining if the vehicle is in the hotel power mode;
selectively powering the electrically powered vehicle accessory using the battery while the vehicle is in hotel power mode and the engine is not running;
monitoring the battery state of charge;
selectively starting the engine when the battery state of charge is less than or equal to a predetermined minimum state of charge;
operating the engine driven generator to recharge the battery to a predetermined maximum state of charge; and turning off the engine when the battery state of charge is greater than or equal to the predetermined maximum state of charge.

2. A method for reducing engine idling time in a stationary hybrid vehicle that includes a vehicle accessory and a hybrid powertrain having an engine, a generator operatively coupled to the engine, and an energy source, the method comprising:

determining whether the vehicle is stationary;

selectively powering the vehicle accessory using the energy source while the engine is not running;

monitoring the energy source state of charge;

selectively starting the engine when the energy source state of charge is less than or equal to a predetermined minimum state of charge; operating the engine driven generator to recharge the energy source to a predetermined maximum state of charge; and turning off the engine when the energy source state of charge is greater than or equal to the predetermined maximum state of charge.

3. The method of claim 2, wherein determining whether the vehicle is stationary includes determining whether the vehicle parking brake is engaged.

4. The method of claim 2, wherein determining whether the vehicle is stationary includes determining the status of a driver selectable switch.

* * * * *

UNITED STATES PATENT AND TRADEMARK OFFICE
CERTIFICATE OF CORRECTION

| | | |
|---|---|---|
| PATENT NO. | : 7,665,557 B2 | Page 1 of 1 |
| APPLICATION NO. | : 11/154427 | |
| DATED | : February 23, 2010 | |
| INVENTOR(S) | : Douglas A Hughes et al. | |

It is certified that error appears in the above-identified patent and that said Letters Patent is hereby corrected as shown below:

On the cover page, item (75), line 2,

"Jeff Skorvpski" should be -- Jeffrey H. Skorupski --

Signed and Sealed this

Eleventh Day of May, 2010

David J. Kappos
*Director of the United States Patent and Trademark Office*